US006959368B1

(12) United States Patent
St. Pierre et al.

(10) Patent No.: US 6,959,368 B1
(45) Date of Patent: Oct. 25, 2005

(54) METHOD AND APPARATUS FOR DUPLICATING COMPUTER BACKUP DATA

(75) Inventors: Edgar J. St. Pierre, Fall River, MA (US); Peggy A. McBride, Shrewsbury, MA (US); Glenn E. Miller, Auburn, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/342,453

(22) Filed: Jun. 29, 1999

(51) Int. Cl.[7] .......................... G06F 12/00; G06F 13/00
(52) U.S. Cl. ........................ 711/162; 711/100; 711/161
(58) Field of Search ........................ 711/100, 161, 162, 711/200, 204, 154; 707/200, 204; 714/13, 714/15

(56) References Cited

U.S. PATENT DOCUMENTS

| 4,710,870 | A | * | 12/1987 | Blackwell et al. | 711/162 |
|---|---|---|---|---|---|
| 5,086,502 | A | * | 2/1992 | Malcolm | 714/100 |
| 5,642,496 | A | * | 6/1997 | Kanfi | 711/162 |
| 5,649,196 | A | * | 7/1997 | Woodhill et al. | 707/204 |
| 5,758,359 | A | * | 5/1998 | Saxon | 707/204 |
| 5,765,173 | A | * | 6/1998 | Cane et al. | 707/202 |
| 5,778,395 | A | * | 7/1998 | Whiting et al. | 707/204 |
| 5,829,047 | A | * | 10/1998 | Jacks et al. | 711/162 |
| 6,003,044 | A | * | 12/1999 | Pongracz et al. | 707/204 |
| 6,023,707 | A | * | 2/2000 | Hamada et al. | 707/202 |
| 6,119,209 | A | * | 9/2000 | Bauman | 711/162 |
| 6,353,878 | B1 | * | 3/2002 | Dunham | 711/162 |

* cited by examiner

Primary Examiner—Tuan V. Thai
(74) Attorney, Agent, or Firm—Wolf, Greenfield & Sacks, P.C.

(57) ABSTRACT

Method and apparatus for performing logical duplication of backup data in a computer system including a host computer, a storage device storing data for the host computer, and at least one computer-readable backup storage medium storing backup data copied from the storage device, is disclosed. In one embodiment, a method copies only a subset of the backup data onto at least one computer-readable duplicate backup storage medium as duplicate backup data so that the duplicate backup storage medium is not an exact duplicate of the at least one backup storage medium. For example, in one embodiment, in which the backup data includes a plurality of work items, a subset of the work items are copied onto the at least one duplicate backup storage medium. Method and apparatus for restoring backup data of interest from duplicate backup storage media are also disclosed.

29 Claims, 5 Drawing Sheets

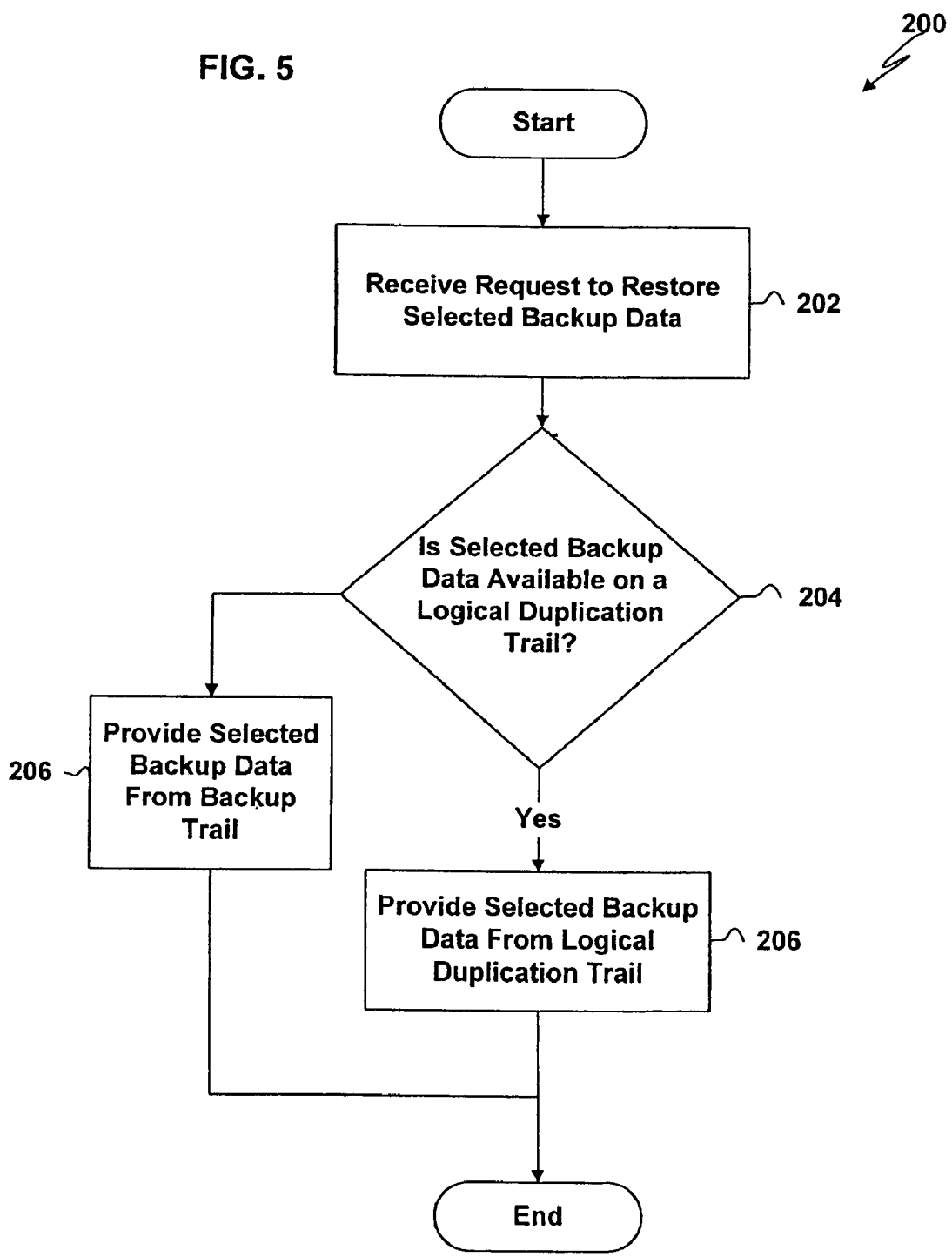

METHOD AND APPARATUS FOR DUPLICATING COMPUTER BACKUP DATA

FIELD OF THE INVENTION

The present invention is directed to a method and apparatus for performing duplication of computer backup data.

DESCRIPTION OF THE RELATED ART

Conventional computer systems typically include a backup storage device including one or more backup storage media, such as backup tapes, to back up important data stored on a client computer storage device. Periodically backing up client data can be critical in case the client data become unavailable or corrupted. In such an event, the client data can be restored from the backup storage media. Backup storage media are often shipped off-site or otherwise safeguarded to ensure that they retain their integrity and remain available in case client data need to be restored. It is possible, however, for backup storage media to be damaged or for the backup data stored on them to become corrupted. In such an event it may be impossible to recover lost client data. To address this problem, some computer systems allow backup storage media to be duplicated. Typically, after client data have been backed up to backup storage media, an exact copy of each of the backup storage media is made onto a corresponding duplicate backup storage medium. This process is called "media duplication." In a variant of media duplication referred to as synchronous media duplication, client data are written to simultaneously to backup storage media and duplicate backup storage media using multiple backup storage devices. The backup storage media may, for example, be retained on-site and the duplicate backup storage media shipped off-site. If there subsequently is a need to restore client data and the backup storage media are unavailable or corrupted, the client data may be restored from the duplicate backup storage media.

Computer systems for backing up and restoring client data may be configured in any of a number of ways. For example, FIG. 1 shows a conventional computer system 10 including a client computer 12, client data 16 generated by the client computer 12, and a backup server 20 for backing up the client data 16 onto backup storage media 28a–e in a backup storage device 26. Typically, the client data 16 resides on a storage device such as a hard disk drive, and the backup storage media 28a–e are backup tapes or other suitable storage media. An example of a storage device on which the client data 16 may be stored is the Symmetrix line of disk arrays, available from EMC Corporation, Hopkinton, Mass. The client data 16 includes work items 16a–d, such as file systems, directories, databases, or files. The backup server 20 includes a server backup process 22 that controls backup of the client data 16.

For example, in some systems the server backup process 22 initiates backup of the client data 16 by sending an instruction to a client backup process 14, residing on the client computer 12, to begin backing up specified ones of the work items 16a–d in the client data 16. The computer system 10 may, however, be configured in any of a variety of ways, and the configuration shown in FIG. 1 is merely an illustrative example.

When the client backup process 14 receives the instruction from the server backup process 22 to initiate backup of the specified ones of the work items 16a–d, the client backup process 14 transmits the specified ones of the work items 16a–d to the server backup process 22 and instructs the server backup process 22 to store the work items on a specified one or more of the backup storage media 28a–e. The specified backup storage media are collectively referred to as a backup trail. For example, as shown in FIG. 1, the backup storage media 28a–b constitute a backup trail 29. The backup storage media in a backup trail are typically specified to be used in a particular order. Typically, work items are backed up to the first backup storage medium in the backup trail until the first backup storage medium becomes full or the backup is complete. When the first backup storage medium becomes full, the second backup storage medium in the backup trail is used to store the next work items in the backup data. Similarly, when a subsequent backup of newer versions of the same work items is made, the newer versions of the work items are typically stored beginning at the first available storage location in the backup trail (e.g., after the backup of the previous versions of the work items). A backup trail may thus include multiple instances of a set of work items.

The backup server 20 includes a backup media file system 24a that reads data from and writes data to the backup storage media 28a–e on behalf of components such as the server backup process 22. The backup media file system 24a keeps track of the mapping between physical storage locations on the backup storage media 28a–e and logical units of data, such as files. To write a file to one of the backup storage media 28a–e, the server backup process 22 sends an "open file" command to the backup media file system 24a, indicating a file name, a volume name of one of the backup storage media 28a–e, and an indication that the file is to be opened for writing. The server backup process 22 then sends a logical data output stream 44 corresponding to the file to be written to the backup media file system 24a. The backup media file system 24a converts the logical data output stream 44 into a raw byte output stream 40 in a format suitable for writing to physical storage locations on the selected backup storage medium. The backup media file system 24a transmits the raw byte output stream 40 to the backup storage device 26 for storage on the selected backup storage medium. The backup media file system 24a is also responsible for reading and writing file meta-data (e.g., file name and file creation time) from and to backup storage media.

Similarly, to read a file from a selected one of the backup storage media 28a–e, the server backup process 22 sends an "open file" command to the backup media file system 24a, indicating a file name, a volume name of one of the backup storage media 28a–e, and an indication that the file is to be opened for reading. The backup media file system 24a reads a raw byte input stream 38 from the physical storage locations corresponding to the indicated file on the selected one of the backup storage media 28a–e and converts the raw byte input stream 38 to a logical data input stream 42, which is delivered to the server backup process 22.

Returning to the backup operation described above, the backup media file system 24a transmits the received work items 16a–d to the backup storage device 26 for storage on the backup storage media in the backup trail 29 as backup data in an appropriate format. When the backup operation is complete, the backup storage media in the backup trail are retained in case the client data 16 becomes unavailable or corrupted. In such an event, the client data 16 may be restored from the backup storage media in the backup trail.

Some computer systems provide a facility for duplicating backup storage media onto duplicate backup storage media. This process is referred to as "media duplication," since each of the duplicate copies made is a duplicate of the entire backup storage medium duplicated. The duplicate backup storage media are typically collectively referred to herein as a media duplication trail. For example, referring again to FIG. 1, backup storage media 28d–e constitute a media duplication trail 31, in which backup storage medium 28d is an exact copy of backup storage medium 28a, and backup storage medium 28e is an exact copy of backup storage medium 28b. Performing media duplication provides an extra degree of security in case the client data 16 become corrupted or otherwise inaccessible. Some systems, for example, will attempt to restore information from the media duplication trail if an attempt to restore the information from the backup trail fails (because, for example, data on the backup trail have become corrupted or backup storage media in the backup trail are unavailable).

Media duplication can be performed in many ways. An example of one way that media duplication can be performed is explained with respect to the system 10 shown in FIG. 1, wherein the backup server 20 includes a media duplication process 36 for duplicating one or more of the backup storage media 28a–e in their entirety. After the work items 16a–d have been backed up to the backup trail 29, the media duplication process 36 duplicates the backup storage media in the backup trail 29 by copying the backup storage media 28a–b, in their entirety, to the media duplication trail 31. Each of the backup storage media 28a–b in the backup trail 29 is assigned to a single backup storage medium in the media duplication trail 31, resulting in a one-to-one correspondence between backup storage media 28a–b in the backup trail 29 and backup storage media 28d–e in the corresponding media duplication trail 31. Although all of the backup storage media 28a–e are shown in FIG. 1 within the same backup storage device 26, the backup storage media 28a–e may be distributed among multiple backup storage devices. Backup storage media in a backup trail may be in the same backup storage device or in a different backup storage device than the duplicate backup storage media in the corresponding media duplication trail. As a result, each of the backup storage trail 29 and the media duplication trail 31 may include backup storage media in any available backup storage device.

More specifically, the media duplication process 36 typically duplicates a backup storage medium by sequentially reading raw backup data from the backup storage medium as a raw byte input stream 46 and sequentially writing the raw backup data to the corresponding duplicate backup storage medium in the media duplication trail as a raw byte output stream 48. Each byte in the raw byte input stream 46 is written to the raw byte output stream 48.

The result of media duplication is that each of the duplicate backup storage media in the media duplication trail 31 contains all of the backup data stored on the corresponding backup storage medium in the backup trail 29. In fact, each duplicate backup storage medium is typically an exact byte-for-byte copy of the corresponding backup storage medium, differing possibly only in arrangement of the backup data (e.g., the original backup storage medium and duplicate backup storage medium may have bad sectors in different locations) and in the content of some unique identifier for the media (e.g., a volume name). Furthermore, each duplicate backup storage medium is required to be the same type of storage medium as the corresponding backup storage medium.

One example of how the media duplication process 36 can be instructed to perform media duplication in conventional systems is as follows. The backup server 20 includes a volume manager process 30 which manages a volume database 32 containing information about the backup storage media 28a–e, such as their volume names, their current location (e.g., whether they are accessible to the backup storage device 26 or have been shipped off-site), and whether they have been scheduled for media duplication. When the server backup process 22 finishes backing up the work items 16a–d to the backup trail 29, the server backup process 22 instructs the volume manager 30, through the backup media file system 24a, to schedule the backup storage media in the backup trail 29 for media duplication. The media duplication process 36 periodically queries the volume database 32 (through the volume manager process 30) to determine whether any of the backup storage media 28a–e in the backup storage device 26 are scheduled for media duplication. If any of the backup storage media 28a–e are scheduled for media duplication, the media duplication process 36 duplicates the scheduled backup storage media as described above.

After duplicating the backup storage media in the backup trail 29, the media duplication process 36 typically updates the volume database 32 (through the volume manager process 30) to indicate which of backup storage media 28a–e have been duplicated and to which of the backup storage media 28a–e they have been duplicated. This information may be used, as described in more detail below, to identify a duplicate of one of the backup storage media 28a–e if the backup storage medium is unavailable.

The server backup process 22 may also be used to initiate and control restoration of backup data from the backup storage media 28a–e. A backup catalog 34 on the backup server 20 contains information about backup data stored on the backup storage media 28a–e. For example, the backup catalog 34 identifies the work items 16a–d that have been backed up on the backup storage media 28a–e, the dates and times at which the work items were backed up, the volume names of the backup storage media 28a–e on which the work items 16a–d have been backed up, and the paths from which the work items 16a–d were backed up. To restore selected backup data (e.g., particular work items or particular files within work items) from the backup storage media 28a–e, the server backup process 22 typically sends an instruction to the backup media file system 24a to restore the selected backup data from one or more of the backup storage media 28a–e. The backup media file system 24a requests that the volume manager process 30 mount in the backup storage device 26 a backup storage medium containing the backup data. In response, the volume manager 30 determines whether the original backup storage medium on which the selected backup data are stored is available by querying the volume database 32. If the original backup storage medium is available, the volume manager 30 mounts the original backup storage medium. Otherwise, the volume manager process 30 determines whether a duplicate of the original backup storage medium is available by querying the volume database 32. If a duplicate is available, the volume manager process 30 mounts the available duplicate. After mounting the appropriate backup storage medium, the volume manager process 30 provides the backup media file system 24a with an identifier of the location of the mounted backup storage medium. The backup media file system 24a may uses this identifier to open the appropriate backup storage medium (either the original backup storage medium or a duplicate backup storage medium) and read the requested backup data therefrom, in a manner that is transparent to the backup media file system 24a.

Referring again to FIG. 1, in some systems the server backup process 22 may be used to back up multiple subsets of the client data 16 in parallel. For example, the client data 16 may include multiple file systems, in which case multiple instances of the server backup process 22 may be executed in parallel to back up the multiple file systems in parallel. For example, each of the server backup process 22 and the client backup process 14 may include a plurality simultaneously executing instances corresponding to the number of file systems to be backed up. Each instance of the client backup process 14 may then transmit data for a particular one of the multiple file systems to a corresponding instance of the server backup process 22 on the backup server 20. As each instance of the server backup process 22 receives data from the corresponding instance of the client backup process 14, the server backup process 22 sends the received data to the backup media file system 24*a*, which stores the data at the next sequentially available location on the backup storage medium currently in use. It should be apparent that this will result in data from the multiple file systems being interwoven on the current backup storage medium. If this backup storage medium is duplicated by the media duplication process 36 using media duplication, as described above, the backup data on the duplicate backup storage medium will also be interwoven. A subsequent attempt to restore data corresponding to a particular file system from the backup storage medium or from the duplicate backup storage medium will result in the file system data being read from non-consecutive locations on the backup storage medium.

If there are large amounts of client data 16 and the backup storage media 28*a*–*e* are duplicated frequently, media duplication can require hundreds of backup tapes and many hours to perform. Furthermore, performing media duplication of the backup storage media 28*a*–*e* using conventional methods involves duplicating all of the data on each backup storage medium onto a corresponding duplicate backup storage medium. Performing duplication of backup media in this way can therefore be a very time-consuming and expensive process.

SUMMARY

In one illustrative embodiment, the invention is directed to a method in a computer system including a host computer, a storage device storing data for the host computer, and at least one computer-readable backup storage medium storing backup data copied from the storage device for duplicating at least some of the backup data stored on the backup storage medium. The method comprises a step of: copying only a subset of the backup data onto at least one computer-readable duplicate backup storage medium as duplicate backup data so that the duplicate backup storage medium is not an exact duplicate of the at least one backup storage medium.

In another illustrative embodiment, the invention is directed to a computer-readable medium encoded with a program for execution on a computer system including a host computer, a storage device storing data for the host computer, and at least one computer-readable backup storage medium storing backup data copied from the storage device. The program, when executed on the computer system, performs a method of duplicating at least some of the backup data stored on the backup storage medium. The method comprises a step of: copying only a subset of the backup data onto at least one computer-readable duplicate backup storage medium as duplicate backup data so that the duplicate backup storage medium is not an exact duplicate of the at least one backup storage medium.

In a further illustrative embodiment, the invention is directed to a backup server for use in a computer system including a host computer, a storage device storing data for the host computer, and at least one computer-readable backup storage medium storing backup data copied from the storage device. The backup server comprises a controller to control duplication of the backup data, the controller being adapted to copy only a subset of the backup data onto at least one computer-readable duplicate backup storage medium as duplicate backup data, so that the duplicate backup storage medium is not an exact duplicate of the at least one backup storage medium.

In yet another illustrative embodiment, the invention is directed to a method in a computer system including a host computer, a storage device storing data for the host computer, and at least one computer-readable backup storage medium storing backup data copied from the storage device, for duplicating at least some of the backup data stored on the at least one backup storage medium. The backup data includes a first work item. The method comprises steps of: reading the backup data corresponding to the first work item from at least one backup storage medium as a logical data stream; and writing the backup data read from the at least one backup storage medium to at least one duplicate backup storage medium as a logical data stream.

In one illustrative embodiment, the invention is directed to a computer-readable medium encoded with a program for execution on a computer system including a host computer, a storage device storing data for the host computer, and at least one computer-readable backup storage medium storing backup data copied from the storage device. The backup data includes a first work item. The program, when executed on the computer system, performs a method for duplicating at least some of the backup data stored on the backup storage medium. The method comprises steps of: reading the backup data corresponding to the first work item from at least one backup storage medium as a logical data stream; and writing the backup data read from the at least one backup storage medium to at least one duplicate backup storage medium as a logical data stream.

In another illustrative embodiment, the invention is directed to a backup server for use in a computer system including a host computer, a storage device storing data for the host computer, and at least one computer-readable backup storage medium storing backup data copied from the storage device. The backup data including a first work item, the backup server comprises: a controller to control duplication of the backup data, the controller being adapted to read the backup data corresponding to the first work item from at least one backup storage medium as a logical data stream, and to write the backup data read by the controller to at least one duplicate backup storage medium as a logical data stream.

In a further illustrative embodiment, the invention is directed to a method in a computer system including a host computer, a storage device storing data for the host computer, and a first computer-readable backup storage medium storing backup data copied from the storage device, for duplicating at least some of the backup data stored on the first computer-readable backup storage medium. The first computer-readable backup storage medium is of a first type. The method comprises a step of: copying at least some of the backup data from the first computer-readable backup storage medium to a second computer-readable backup storage medium of a second type that differs from the first type.

In yet another illustrative embodiment, the invention is directed to a computer-readable medium encoded with a program for execution on a computer system including a host computer, a storage device storing data for the host computer, and a first computer-readable backup storage medium storing backup data copied from the storage device. The first computer-readable backup storage medium is of a first type. The program, when executed on the computer system, performs a method for duplicating at least some of the backup data stored on the first computer-readable backup storage medium. The method comprises a step of: copying at least some of the backup data from the first computer-readable backup storage medium to a second computer-readable backup storage medium of a second type that differs from the first type.

In one illustrative embodiment, the invention is directed to a backup server for use in a computer system including a host computer, a storage device storing data for the host computer, and a first computer-readable backup storage medium storing backup data copied from the storage device. The first computer-readable backup storage medium is of a first type. The backup server comprises: a controller to control duplication of the backup data, the controller being adapted to copy at least some of the backup data from the first computer-readable backup storage medium to a second computer-readable backup storage medium of a second type that differs from the first type.

In another illustrative embodiment, the invention is directed to a method in a computer system including a host computer, a storage device storing data for the host computer, and a plurality of computer-readable backup storage media storing backup data copied from the storage device. The method comprises a step of: copying backup data from at least two of the plurality of backup storage media onto a single duplicate backup storage medium.

In a further illustrative embodiment, the invention is directed to a computer-readable medium encoded with a program for execution on a computer system including a host computer, a storage device storing data for the host computer, and a plurality of computer-readable backup storage media storing backup data copied from the storage device. The program, when executed on the computer system, performs a method of duplicating at least some of the backup data stored on the at least one backup storage medium. The method comprises a step of: copying backup data from at least two of the plurality of backup storage media onto a single duplicate backup storage medium.

In one illustrative embodiment, the invention is directed to a backup server for use in a computer system including a host computer, a storage device storing data for the host computer, and a plurality of computer-readable backup storage media storing backup data copied from the storage device. The backup server comprises: a controller to control duplication of the backup data, the controller being adapted to copy backup data from at least two of the plurality of backup storage media onto a single duplicate backup storage medium.

In another illustrative embodiment, the invention is directed to a method in a computer system including a host computer, a storage device storing data for the host computer, at least one computer-readable backup storage medium storing backup data copied from the storage device, and at least one computer-readable duplicate backup storage medium storing backup data copied from the at least one computer-readable backup storage medium, for restoring at least some of the backup data. The method comprises a step of: restoring the at least some of the backup data from the duplicate backup storage medium when both the at least one duplicate backup storage medium and the backup storage medium are available.

In a further illustrative embodiment, the invention is directed to a computer-readable medium encoded with a program for execution on a computer system including a host computer, a storage device storing data for the host computer, at least one computer-readable backup storage medium storing backup data copied from the storage device, and at least one computer-readable duplicate backup storage medium storing backup data copied from the at least one computer-readable backup storage medium. The program, when executed on the computer system, performs a method comprising steps of: restoring the at least some of the backup data from the duplicate backup storage medium when both the at least one duplicate backup storage medium and the backup storage medium are available.

In yet another illustrative embodiment, the invention is directed to a backup server in a computer system including a host computer, a storage device storing data for the host computer, at least one computer-readable backup storage medium storing backup data copied from the storage device, and at least one computer-readable duplicate backup storage medium storing backup data copied from the at least one computer-readable backup storage medium. The backup server comprises: a controller to control restoration of the backup data, the controller being adapted to restore the at least some of the backup data from the duplicate backup storage medium when restoring the at least some of the backup data from the duplicate backup storage medium when both the at least one duplicate backup storage medium and the backup storage medium are available to the backup server.

In one illustrative embodiment, the invention is directed to a method in a computer system including a host computer, a storage device storing data for the host computer, and a first computer-readable backup storage medium storing backup data copied from the storage device for duplicating the data for the work item. The backup data includes data for a work item stored non-sequentially on the first computer-readable backup storage medium. The method comprises a step of: copying the data for the work item to a second computer-readable backup storage medium so that the data for the work item is stored sequentially on the second computer-readable backup storage medium.

In another illustrative embodiment, the invention is directed to a computer-readable medium encoded with a program for execution on a computer system including a host computer, a storage device storing data for the host computer, and a first computer-readable backup storage medium storing backup data copied from the storage device. The backup data includes data for a work item stored non-sequentially on the first computer-readable backup storage medium. The program, when executed on the computer system, performs a method of duplicating the data for the work item. The method comprises a step of: copying the data for the work item to a second computer-readable backup storage medium so that the data for the work item is stored sequentially on the second computer-readable backup storage medium.

In a further illustrative embodiment, the invention is directed to a backup server for use in a computer system including a host computer, a storage device storing data for the host computer, and a first computer-readable backup storage medium storing backup data copied from the storage device, the backup data including data for a work item stored non-sequentially on the first computer-readable backup storage medium. The backup server comprises: a controller to control duplication of the data for the work item, the controller being adapted to copy the data for the work item to a second computer-readable backup storage medium so that the data for the work item is stored sequentially on the second computer-readable backup storage medium.

BRIEF DESCRIPTION OF THE DRAWINGS

FIG. 5 is a flow chart of a process according to one embodiment of the invention for restoring backup data that has been logically duplicated.

DETAILED DESCRIPTION

Figure 1:
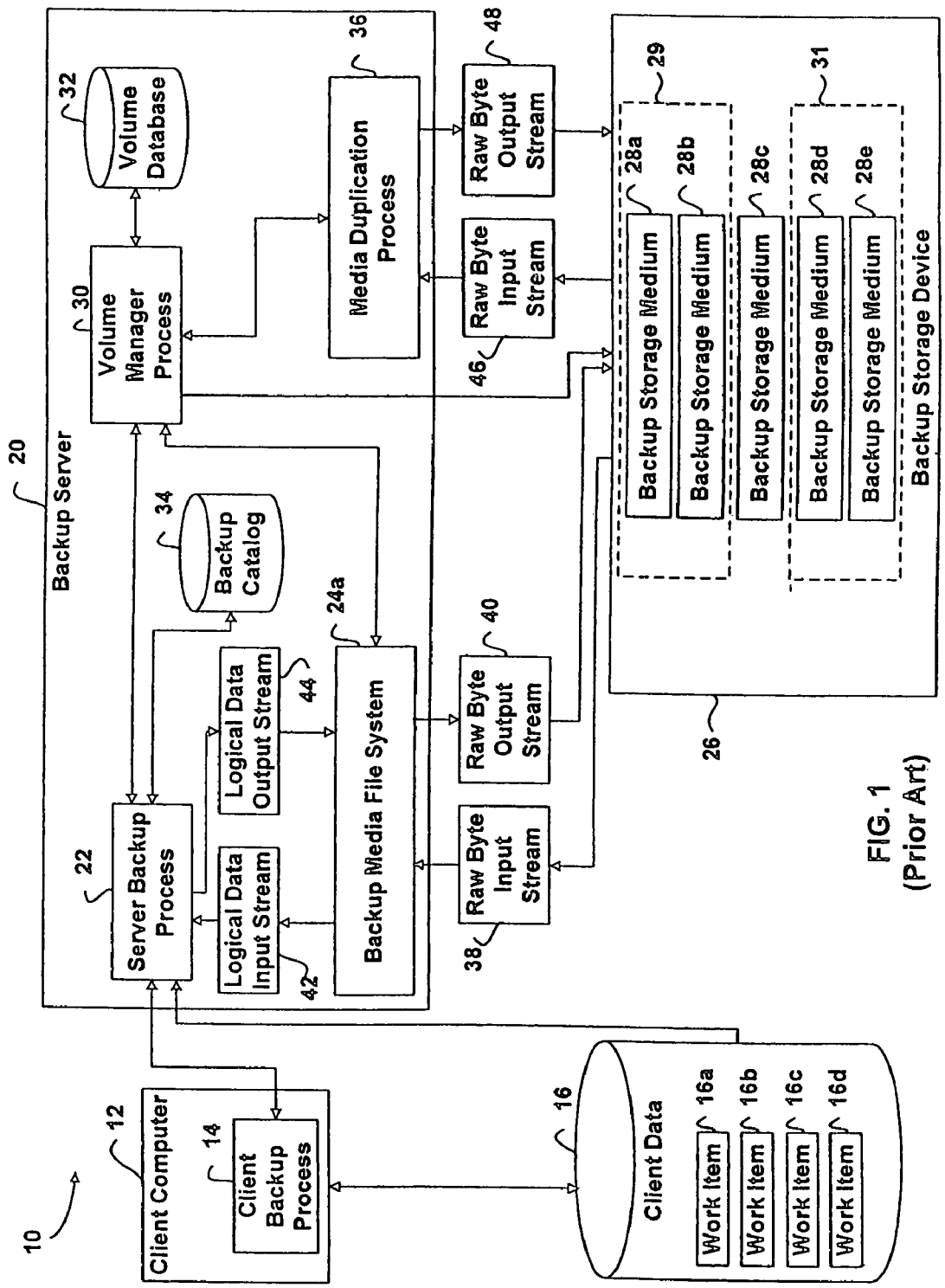
FIG. 1 is a block diagram of a prior art computer system for backing up client data onto backup storage media and for duplicating the backup storage media.

One illustrative embodiment of the invention is directed to a method and apparatus for duplicating backup data on a backup storage medium by reading the backup data from the backup storage medium as a logical stream of data and writing the backup data to another backup storage medium (referred to as a "duplicate backup storage medium") as a logical stream of data. Such duplication is referred to herein as "logical duplication." Logical duplication enables many particular applications and has numerous advantages over conventional media duplication, in which all of the backup data on a backup storage medium are read and written as raw byte streams.

For example, in some situations it is desirable to duplicate only particular work items on a backup storage medium. Using logical duplication in accordance with one embodiment of the invention, the particular work items may be duplicated by reading each of the work items as a logical data stream from a backup storage medium and writing each of the work items to a duplicate backup storage medium as a logical data stream. In this way, it is possible to duplicate only specified work items on a backup storage medium. In contrast, conventional media duplication requires duplicating all work items on a backup storage medium, even those for which duplication is not desired. Logical duplication not only increases the speed of duplication but also allows work items from multiple backup storage media to be duplicated onto fewer backup storage media, thus saving both storage space and cost. Another advantage of logical duplication is that it provides the ability to copy a work item that is interwoven with other work items on a backup storage medium to sequential storage locations on a duplicate backup storage medium. The work item may then be restored more efficiently from the duplicate backup storage medium than from the backup storage medium because the work item may be read from sequential storage locations on the duplicate backup storage medium. A further advantage of logical duplication is that it allows different backup data (e.g., different work items) to be duplicated onto different types of backup storage media. For example, an important work item (e.g., financial data) may be duplicated onto high-quality backup storage media, while a less important work item (e.g., email) may be duplicated onto lower-quality backup storage media. Media duplication, in contrast, is limited to duplicating all work items on a backup storage medium onto a single duplicate backup storage medium. The ability to duplicate work items onto different types of backup storage media can result in significant cost savings. These and other embodiments and advantages will be described in more detail below.

In one embodiment of the invention, backup data stored in a backup trail are duplicated to backup storage media in a logical duplication trail. As used herein, "logical duplication trail" refers to a set (e.g., an ordered sequence) of one or more backup storage media assigned to store duplicates of selected backup data from one or more backup trails. A single logical duplication trail may include multiple types of backup storage media.

Figure 2:
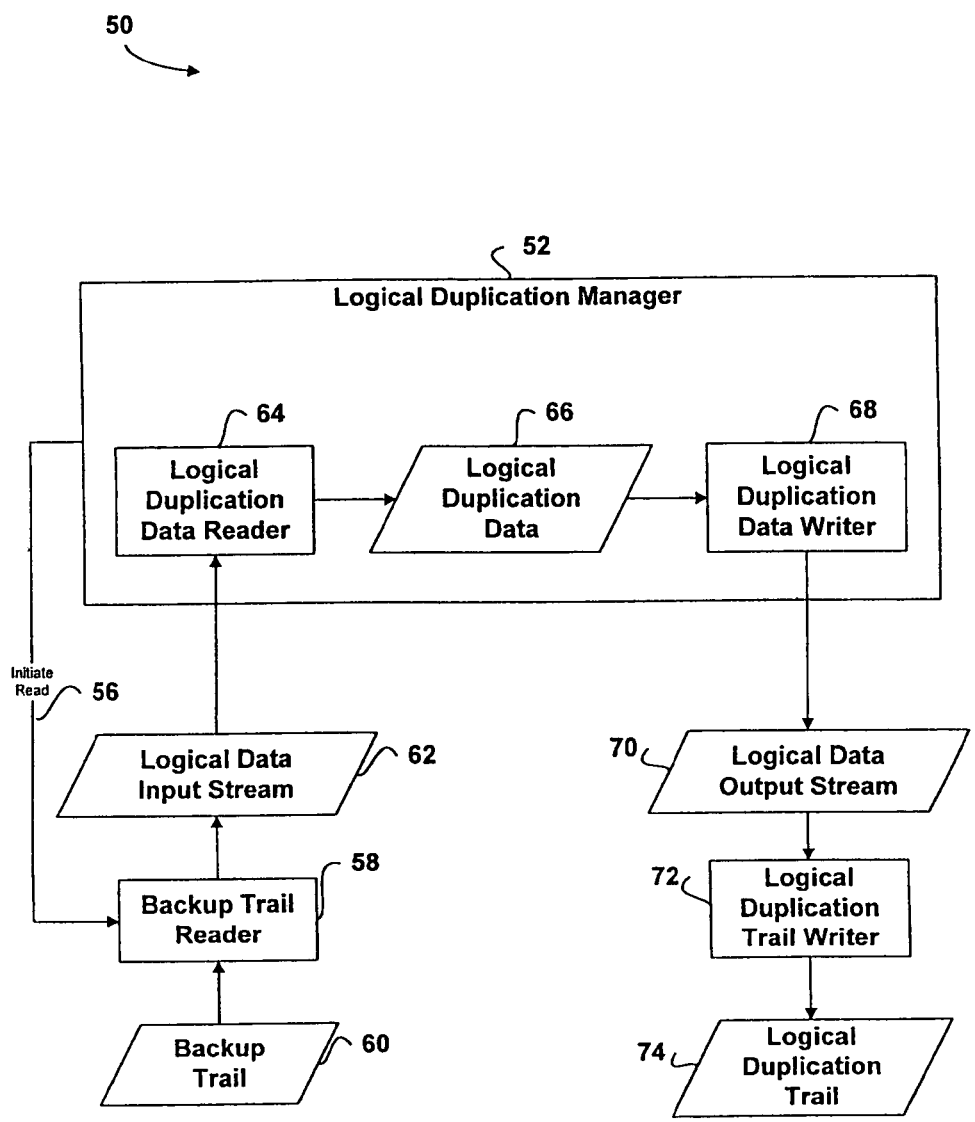
FIG. 2 is a data flow diagram of an embodiment of a system for performing logical duplication of backup data according to the present invention.

Referring to FIG. 2, a data flow diagram of one embodiment of a system 50 for duplicating selected backup data from a backup medium to a logical duplication medium is shown. The system 50 includes a logical duplication manager 52 for managing the logical duplication process. The logical duplication manager 52 may, for example, be a computer program executing on a computer processor in the backup server 20 or other system component. The logical duplication manager 52 may, however, be implemented in any of a number of ways, such as in hardware, software, firmware, or any combination of them.

Figure 3:
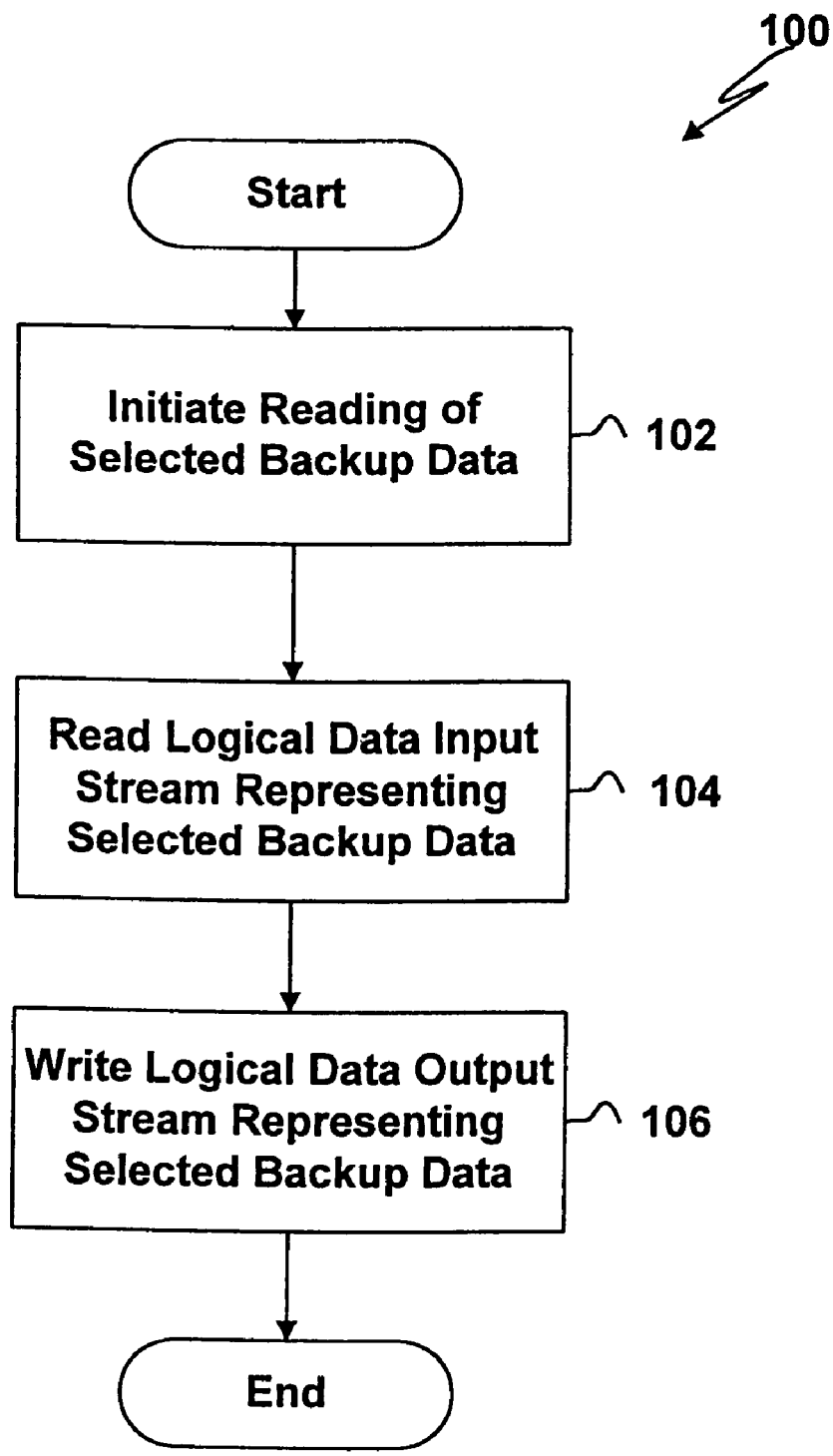
FIG. 3 is a flow chart of an embodiment of a process for performing logical duplication of backup data according to the present invention.

Referring to FIG. 3, one embodiment of a process 100 that the logical duplication manager 52 may use to duplicate selected backup data is shown. The logical duplication manager 52 sends a signal 56 to a backup trail reader 58 to begin reading selected backup data from a backup trail 60 (step 102). The backup trail reader 58 reads the selected backup data from the backup trail 60 and generates a logical data input stream 62 representing the selected backup data in a form suitable for reading by the logical duplication manager 52. A logical duplication data reader 64 within the logical duplication manager 52 receives the logical data input stream 62 representing the selected backup data (step 104), and extracts logical duplication data 66 from the logical data input stream 62. The logical duplication data 66 represents the selected backup data read from the backup trail 66. The logical duplication data 66 may be represented in any of a number of forms, such as a data structure stored in a computer-readable memory, a file stored on a computer readable medium, a logical stream of data transmitted between communication ports, or combinations thereof.

A logical duplication data writer 68 generates a logical data output stream 70 from the logical duplication data 66 and passes the logical data output stream 70 to a logical duplication trail writer 72 (step 106). The logical duplication trail writer 72 writes the logical data output stream 70 to a logical duplication trail 74.

Backup storage media typically store backup data in storage units referred to as blocks. The data stored in a block includes both backup data and associated control data. Control data may include, for example, the volume name of the backup storage medium and information uniquely identifying the backup data stored in the block, such as a unique identifier of the file of which the backup data is a part. When backup data is read from a backup storage medium as a logical stream of data using logical duplication, the backup data is read from the appropriate blocks on the backup, while the control data may or may not be read from the blocks. When the backup data is written to a duplicate backup storage medium using logical duplication, the backup data is written to blocks on the duplicate backup storage medium and new control data are generated for the backup data and written to the appropriate blocks on the duplicate backup storage medium. Although the contents of the newly generated control data may be the same as the contents of the control data associated with the backup data on the backup storage medium, such control data are not copied from the backup storage medium to the duplicate backup storage medium. Rather, when logical duplication is used to duplicate the backup data, new control data are generated for the backup data and written to the duplicate backup storage medium. This is in contrast to media duplication, which performs raw bit transfers that do not distinguish between backup data and control data.

In one embodiment, the selected backup data to be logically duplicated can include selected ones of the work items 16a–d. The backup trail reader 58 can generate a logical data input stream, such as logical data input stream 62, for each of the selected work items. Similarly, the logical duplication data writer 68 can generate a logical data output stream, such as logical data output stream 70, for each of the selected work items. In one embodiment, the selected work items are duplicated serially; i.e., duplication of one work item is completed before commencing duplication of a second work item. In other embodiments, multiple selected work items are duplicated in parallel, such as by multiple instances of the client backup process 14 and the server backup process 22.

In one embodiment, the logical duplication manager 52 writes the logical data output stream 70 to a logical duplication trail including fewer backup storage media than the corresponding backup trail. This can be accomplished by copying less than all of the backup data (e.g., only selected work items) from the backup trail to the logical duplication trail. As a result, duplicated backup data (e.g., selected work items) may be consolidated onto fewer duplicate backup storage media than the number of backup storage media in the backup trail, thereby conserving use of backup storage media compared to conventional media duplication. For example, a user desiring to duplicate only selected work items in a backup trail using conventional media duplication must duplicate all of the backup storage media in the backup trail in their entirety, even if the selected work items only comprise a small portion of the backup data stored on the backup storage media in the backup trail. In such a case, media duplication results in the duplication of data that the user does not desire to duplicate, thereby using unnecessary time and backup storage media space.

In contrast, using logical duplication to duplicate only selected work items in a backup trail onto a logical duplication trail may save both time and backup storage media space. For example, selected work items may be read from the backup storage trail and stored in sequential locations on the backup storage media in the logical duplication trail. As a result, the amount of storage space needed to store duplicates of the selected work items is roughly equal to the size of the selected work items, because unnecessary work items are not stored in the logical duplication trail. In some circumstances, for example, it may be possible to duplicate selected work items from a backup trail including many backup tapes onto a logical duplication trail including only a single backup tape. In addition to saving space, time is saved by not reading or writing unnecessary work items.

In another embodiment, selected backup data from a number of backup trails are duplicated to a lesser number of logical duplication trails. For example, work items from a plurality of backup trails can be duplicated to a single logical duplication trail. For reasons similar to those described above, this may result in saving both time and backup storage media space compared to using standard media duplication. For example, if backup storage media in the backup storage trails include substantial amounts of empty storage space, duplicates of the backup storage media made using conventional media duplication will also have the same amount of empty storage space. In contrast, if the work items in these backup storage trails are copied to a single logical duplication trail, the work items may be written sequentially on the backup storage media in the logical duplication trail without leaving blank space. As a result, it may be possible for the logical duplication trail to include fewer backup storage media than the total number of backup storage media contained in the backup storage trails from which the work items were copied. Furthermore, the backup data may be restored more quickly from the duplicate backup media than from the backup storage media, because the backup data may be read sequentially from the duplicate backup storage media. The backup data may thus be restored from the duplicate backup storage media even if the backup storage media are available to increase restore performance.

In conventional backup systems, backup storage media in a backup trail can be assigned expiration times indicating when the backup storage media expire. After the backup storage media expire, they become available for re-use to store backup data or duplicate backup data. All of the duplicate backup data in a single media duplication trail created using conventional media duplication have the same expiration time. In one embodiment of the present invention, backup data in a single backup trail are duplicated to a plurality of logical duplication trails having a plurality of expiration times. For example, a user may define a work item including financial data, another work item including E-mail, and a third work item including all other files. The user may assign all of these work items to a single backup trail to optimize backup time, but assign the financial work item to a logical duplication trail that has a seven-year expiration time, assign the email work item to a logical duplication trail having a one-year expiration time, and assign the remaining work item to a logical duplication trail having a one-week expiration time.

This approach provides flexibility in configuring logical duplication of work items. The user may easily specify different expiration times for work items in different logical duplication trails to suit the characteristics of the work items, even when some or all of the work items are backed up in the same backup trail. Such an ability is not available in systems using media duplication, which duplicate all work items in a backup trail to a media duplication trail having a single expiration time. When a backup storage medium expires, it is considered to be empty and therefore becomes available to store backup data or duplicate backup data. Providing the ability to make some backup data expire earlier than other backup data therefore may result in more backup storage media being available for use and thus reduce the expense of purchasing additional backup storage media.

In another embodiment, selected backup data (e.g., selected work items) backed up to a backup trail are duplicated to a logical duplication trail including backup storage media having a property, such as backup media type or storage capacity, that is different from the backup storage media in the backup trail. Such mixed-media duplication was not possible using previous media duplication techniques, which required that the backup storage media and the duplicate backup storage media be of the same type and size so that raw data could be transferred between the two backup storage media. The ability to include different types of backup storage media in the backup trail and the logical duplication trail is made possible by reading the backup data from the backup storage trail as a logical data input stream, rather than as raw bytes, and by writing the backup data to the logical duplication trail as a logical data output stream, rather than as raw bytes.

For example, the backup trail can include backup tapes, while the logical duplication trail can include recordable compact disks (CDs). The invention, furthermore, is not limited to use with any particular type of storage medium. Suitable backup storage media for the backup and logical duplication trails include, for example, tapes, CDs, optical disks, standard hard disks, and floppy disks. For example, each logical duplication trail may be assigned a particular type of backup storage media. For example, in one embodiment a logical duplication trail containing high-priority work items (such as financial work items) can be assigned to be duplicated onto high-cost (and high quality) backup storage media, and lower-priority work items (such as generic user work items) can be assigned to be duplicated onto lower-cost backup storage media. It should be apparent from this example that one benefit of the ability to assign different backup storage media types to different logical duplication trails is that cost may be saved (e.g., by duplicating low-priority work items onto low-cost backup media) without sacrificing necessary duplication benefits (e.g., maximum duplication quality for high-priority work items).

In one illustrative embodiment of the present invention, restore performance is optimized by restoring backup data from a logical duplication trail. As described above, in a conventional system, when a backup trail including interwoven work items is duplicated using media duplication, the work items are also interwoven in the resulting media duplication trail. Restoring a particular work item from such a backup trail requires that the work item be read from non-sequential locations on the backup storage media. As further described below, in one embodiment of the present invention, when a selected work item in a backup trail (such as a selected work item that is interwoven with other work items in the backup trail) is duplicated to a logical duplication trail, the work item is stored in sequential locations on the duplicate backup storage media in the logical duplication trail. The work item in the logical duplication trail may, therefore, be restored from the logical duplication trail more efficiently than from the backup trail, because the data within the work item may be read sequentially from the logical duplication trail. In one embodiment of the present invention, when a request is made to restore a work item which is backed up both in a backup trail and a logical duplication trail, the work item is restored from the logical duplication trail rather than from the backup trail to maximize the performance of the restore.

In accordance with one embodiment of the invention, multiple work items can be assigned to a single logical duplication trail, and when such multiple work items are duplicated by multiple instances of the client backup process 14 and the server backup process 22, they can be interwoven on the duplicate backup storage media or stored sequentially on the duplicate backup storage media. For example, users who desire maximum restore performance may choose to store the multiple work items sequentially on the duplicate backup storage media, while users who wish to optimize duplication performance may choose to duplicate the multiple work items in parallel and thus interweave the duplicate backup data on the duplicate backup storage media.

In a further embodiment, each of a plurality of work items (e.g., top-level directories in a file system) assigned to a single backup trail are assigned to multiple logical duplication trails. By assigning the work items to multiple logical duplication trails, the work items may be restored in parallel by restoring the multiple logical duplication trails in parallel, thereby reducing restore time. This ability is unavailable in conventional systems using media duplication, in which all items backed up to a single backup trail are also duplicated to a single corresponding media duplication trail.

In a further embodiment of the present invention, work items that are incrementally backed up to a backup trail periodically (e.g., every night) can be duplicated using logical duplication. An incremental backup only backs up those parts of the work items that have changed since the previous backup. The backup data generated in an incremental backup may, therefore, occupy only a small portion of a backup storage medium. Using media duplication to duplicate such a backup storage medium therefore results in a duplicate backup storage medium that contains the incremental backup data and a potentially large amount of unused space. If each incremental backup is stored on a new backup storage medium, media duplication requires that a new duplicate backup storage medium be used to duplicate each incremental backup. Each such duplicate backup medium will have a potentially large amount of unused space. In contrast, using logical duplication, multiple incremental backups may be consolidated onto a single backup storage medium. For example, a user may specify that all new incremental backup data generated periodically (e.g., each night) in a backup trail are to be duplicated each night onto a single logical duplication trail. As a result, the incremental backup data are duplicated sequentially onto a single backup storage medium until the backup storage medium becomes full. If the size of the incremental backup data is relatively small compared to the storage capacity of the backup storage media being used, the savings in duplicate backup storage media may be substantial compared to conventional media duplication.

Figure 4:
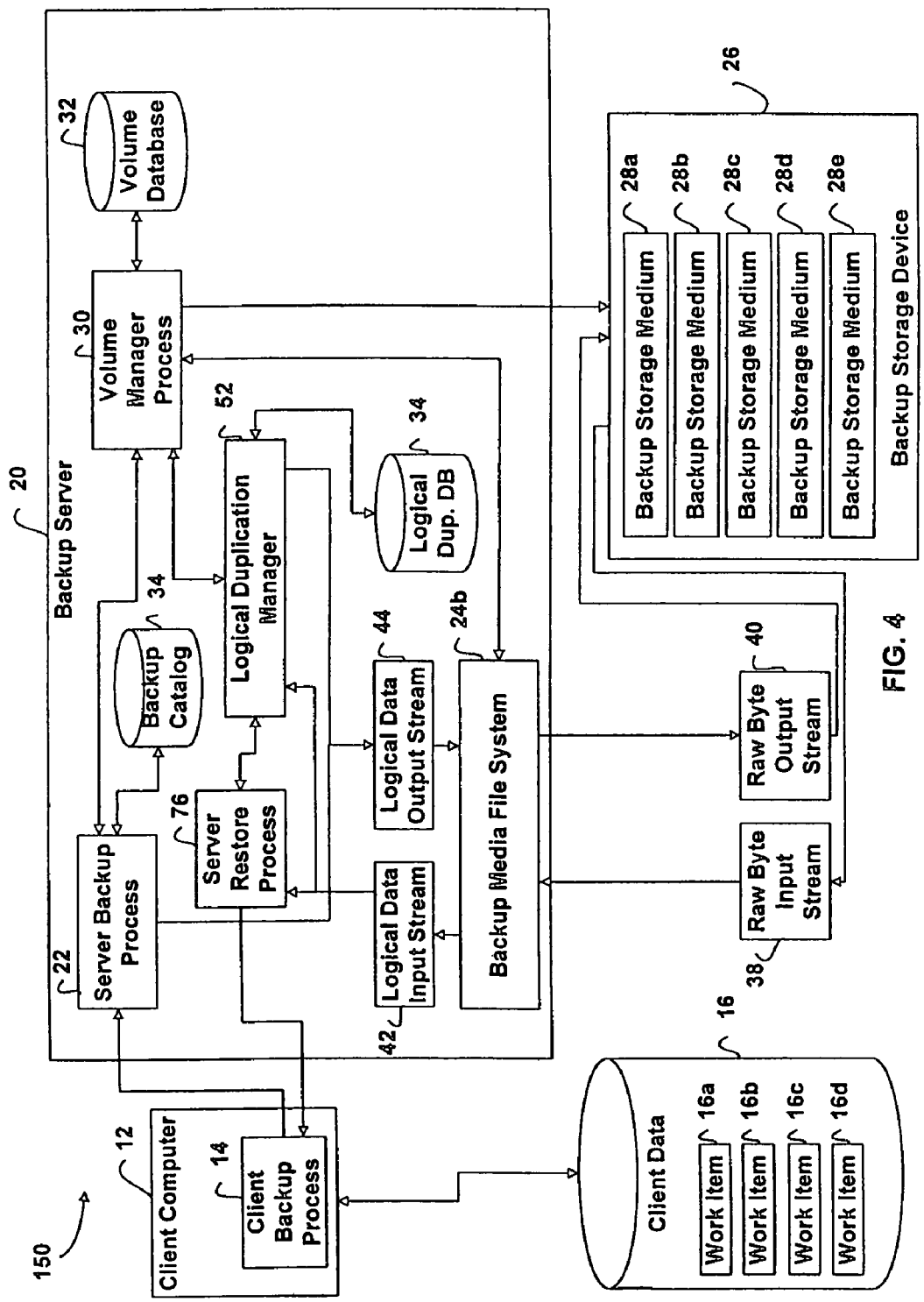
FIG. 4 is a block diagram of an embodiment of a computer system for performing logical duplication and restoration of backup data according to the present invention.

Referring to FIG. 4, an illustrative embodiment of a system 150 for duplicating and restoring backup data according to the present invention is shown. Elements having the same reference numerals as elements shown in FIG. 1 indicate the same elements. The invention, however, is not limited to this architecture. Rather, the invention may be implemented in any of a number of ways and the system 150 shown in FIG. 4 is only one example.

As shown in FIG. 4, the system 150 includes a logical duplication manager 52 for duplicating backup data in a backup trail to a logical duplication trail. The system 150 also includes a logical duplication database 54 that includes information descriptive of characteristics of logical duplication trails, such as information identifying the work items contained in the logical duplication trails, expiration times of the logical duplication trails, and the types of backup storage media used in the logical duplication trails.

Although the logical duplication manager 52 is shown in FIG. 4 as residing on the backup server 20 and the logical duplication manager 52 and server restore process 76 are described as performing logical duplication and restoration functions, respectively, these are only examples and are not limitations of the present invention. For example, logical duplication and restoration of backup data can be performed by elements other than the logical duplication manager 52, such as the server backup process 22, the backup media file system 24b, the client backup process 14, and combinations thereof. Furthermore, the logical duplication manager 52 and/or the server restore process 76 may be located on the client computer 12, the backup storage device 26, the backup server 20, or any other component of the system 150, and may be distributed across multiple system components. Furthermore, the backup server 20 may be implemented on any device capable of performing the responsibilities described herein, such as a standalone computer workstation, a storage device (e.g., a storage device from the Symmetrix line of disk arrays, available from EMC Corporation, Hopkinton, Mass.), or the client computer 12, and may be distributed across multiple system components.

In the embodiment shown in FIG. 4, the backup media file system 24b performs the functions of the backup trail reader 58 and the logical duplication trail writer 72 shown in FIG. 2. For example, the backup media file system 24b reads the raw byte input stream 38 corresponding to selected backup data (e.g., selected work items) from a backup trail including selected ones of the backup storage media 28a–e to generate the logical data input stream 42 provided to the logical duplication manager 52. Similarly, the backup media file system 24b receives the logical data output stream 44 from the logical duplication manager 52 and writes the data contained within the logical data output stream 44 to a logical duplication trail including selected ones of the backup storage media 28a–e. Upon completion of a logical duplication operation (e.g., upon completion of the process 100 shown in FIG. 3), the logical duplication manager 52 updates the contents of the logical duplication database 54 to indicate which backup data have been duplicated and to indicate to which logical duplication trail or trails the duplicated backup data have been assigned.

In one embodiment, when the server backup process 22 finishes backing up selected ones of the work items 16a–d to a backup trail, the server backup process 22 instructs the logical duplication manager 52 to logically duplicate selected ones of the work items 16a–d. For example, the server backup process 22 can instruct the logical duplication process 52 to perform logical duplication by providing the logical duplication process 52 with a description of a logical duplication trail to be created. The description of the logical duplication trail provided by the server backup process 22 may include information about the logical duplication trail to be created, such as the work items to be duplicated to the logical duplication trail and the volume names of the backup storage media on which those work items are stored. Upon receipt of the instruction from the server backup process 22, the logical duplication manager 52 performs logical duplication using, for example, the process 100 shown in FIG. 3.

In the embodiment of FIG. 4, the backup server 20 includes a server restore process 76 for restoring backup data stored in a backup trail or in a logical duplication trail. To restore selected backup data, the server restore process 76 requests the selected backup data from the logical duplication manager 52. FIG. 5 illustrates one example of a process 200 that may be used by the logical duplication manager 52 to handle the request. The process 200 is provided merely as an example, as the invention is not limited to use of this specific process to handle the request. The logical duplication manager 52 receives the request to restore selected backup data (step 202). The logical duplication manager 52 determines whether the selected backup data are available on a logical duplication trail (step 204). The logical duplication manager 52 may make this determination by, for example, examining the contents of the logical duplication database 54. As described above, the logical duplication database 54 stores information such as information identifying the logical duplication trails to which backup data have been logically duplicated and information indicating the current location of logical duplication trails. For example, the logical duplication database 54 indicates, for each logical duplication trail, whether the backup storage media within the logical duplication trail are currently located within the backup storage device 26 or have been shipped off-site.

When the logical duplication manager 52 determines that the selected backup data are available on a logical duplication trail (step 204), the logical duplication manager 52 provides the selected backup data to the server restore process 76 from the logical duplication trail (step 206). The logical duplication manager 52 may provide the selected backup data by requesting it from the backup media file system 24b and obtaining it from the backup media file system 24b in the form of a logical data input stream, such as logical data input stream 42. Alternatively, the logical duplication manager 52 may provide the backup media file system 24b with a volume name of a duplicate backup storage medium containing the selected backup data. The backup media file system 24b may use this volume name to read the selected backup data from the duplicate backup storage medium.

When the logical duplication manager 52 determines that the selected backup data is not available on a logical duplication trail (step 204), the logical duplication manager 52 provides the selected backup data from the backup trail (step 208). If the backup trail is not available, the logical duplication manager 52 may, for example, signal an error to the server restore process 76.

One advantage of the process 200 described above is that it may be used to optimize restore performance. As described above, if a backup trail includes multiple work items that are interwoven on the backup storage media in the backup trail, selected work items in the backup trail may be duplicated by the logical duplication manager 52 in a logical duplication trail in which the data for the selected work items are stored sequentially (i.e., non-interwoven). Restoring one or more of the selected work items from the logical duplication trail may result in better restore performance than would be obtained by restoring the selected work items from the backup trail in which the data for the work items are interwoven.

Although the process 200 shown in FIG. 5 restores selected backup data from an available logical duplication trail rather than restoring the selected backup data from the backup trail, this is not a limitation of the present invention. Rather, the backup server 52 may restore selected backup data from the backup trail rather than from a logical duplication trail, if possible, or use any other method to restore selected backup data.

Although the backup server 20 (FIG. 4) is shown as being coupled to a single client computer 12, the backup server 20 may be coupled to a plurality of client computers to perform backups from and restores to multiple client computers, singly or in parallel. Similarly, although only a single backup storage device 26 is shown in FIG. 4, the system 150 may include a plurality of backup storage devices coupled to the backup server 20. The backup server 20 may perform logical duplication of data from backup trails including backup storage media on any of the plurality of backup storage devices and duplicate the data to logical duplication trails including duplicate backup storage media on any of the plurality of backup storage devices. Any combination of backup storage devices may be coupled to the backup server 20. Similarly, backup storage devices coupled to the backup server 20 may include any type of backup storage media or any combination of backup storage media, as the backup server may read from and write to any type of backup storage media.

It should be appreciated that the logical duplication techniques described above may be used instead of or in conjunction with conventional media duplication techniques. For example, the backup server 20 may allow the user to specify whether a particular backup trail is to be duplicated using media duplication and/or to specify that particular work items are to be logically duplicated to particular logical duplication trails.

In one embodiment, backup data can be duplicated to any number of logical duplication trails. Each such logical duplication trail may have its own set of properties. For example, if a set of work items is assigned to two logical duplication trails, then the work items will be duplicated twice, once onto each of the logical duplication trails. Similarly, if a set of work items is assigned to zero logical duplication trails (i.e., the set of work items is not assigned to any logical duplication trail), then the set of work items is not logically duplicated.

A "work item" as used herein may include any datum or data capable of being stored on a computer-readable medium. For example, a work item may be a file system, directory, file, database or any combination thereof. In one embodiment, work items are read from the backup trail and written to the logical duplication trail serially; in other words, duplication of a first work item is completed before commencing duplication of subsequent work items. In other embodiments, work items are duplicated in parallel by multiple instances of the client backup process 14 and the server backup process 22.

The various elements shown in FIG. 2 and FIG. 4 may be combined or separated into one or more elements for performing the same function. For example, the logical duplication reader 64 and logical duplication writer 68 (FIG. 2) may be combined into a single logical duplication reader/writer for reading and writing logical duplication data. Similarly, the backup trail reader 58 and logical duplication data reader 64 may be combined into a single element, as may the logical duplication trail writer 72 and the logical duplication data writer 68. The logical duplication manager 52 (FIG. 4) may, for example, be combined with the backup media file system 24*b* to provide a single element for reading and writing logical streams of data. The logical duplication database 54 may be part of the logical duplication manager 52 rather than a separate element. The foregoing is merely illustrative, as numerous other ways of combining and separating the various elements shown in FIGS. 2 and 4 are possible, since the present invention is not limited to any particular implementation.

The illustrative embodiments of the present invention discussed above have been described in connection with illustrative systems such as those shown in FIGS. 2 and 4. However, it should be appreciated that the present invention is not limited in this respect, and that the aspects of the present invention described above can be used in connection with computer systems having numerous other configurations capable of performing logical duplication of selected data in a backup trail.

It should be understood that the present invention is not limited to use with any particular computer platform, computer processor, or high-level programming language. Although aspects of the present invention, such as the logical duplication manager 52, the client backup process 14, the server backup process 22, the backup media file system 24*b*, the logical duplication data reader 64, and the logical duplication data writer 68, may be implemented as computer programs executable by a computer processor, elements of the invention may be implemented in software, hardware, firmware, or any combination thereof. The various elements of the invention, either individually or in combination, may be implemented as a computer program product tangibly embodied in a machine-readable storage medium for execution by a computer processor. In this respect, it should be appreciated that all of the system components shown in FIGS. 2 and 4 (e.g., the client backup process 14, the server backup process 22, the logical duplication manager 52, the backup media file system 24*b*, the client backup process 14, the logical duplication data reader 64, and the logical duplication data writer 68) and their sub-components can be generically considered as controllers, such that the computer system 150 can be provided with at least one controller to perform the duplication and restore functions. These functions can be performed by a single controller, or can be distributed amongst multiple controllers in the manner described above.

Various steps of embodiments of the invention, such as those described above and illustrated using flow charts, may be performed by a computer processor executing a program (i.e., software or firmware) tangibly embodied on a computer-readable medium to perform functions by operating on input and generating output. The computer-readable medium may, for example, be a memory in the backup server 20 (FIG. 4), or a transportable medium such as a compact disk, a floppy disk, or a diskette, such that a computer program embodying the aspect of the present invention can be loaded onto any computer. The computer program is not limited to any particular implementation and may, for example, include an application program, foreground or background process, driver, or any combination thereof, executing on a single computer processor or multiple computer processors. Computer programming languages suitable for implementing such a system include procedural programming languages, object-oriented programming languages, and any combination thereof.

Having described several embodiments of the invention in detail, various modifications and improvement will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system including a host computer, a storage device storing data for the host computer, and at least one computer-readable backup storage medium storing backup data copied from the storage device, a method for duplicating at least some of the backup data stored on the backup storage medium, the method comprising a step of:

(A) copying only a subset of the backup data from the at least one backup storage medium onto at least one computer-readable duplicate backup storage medium as duplicate backup data so that the duplicate backup storage medium is not an exact duplicate of the at least one backup storage medium;

wherein the at least one backup storage medium comprises a first backup storage medium including incremental backup data for at least one work item at a first point in time and a second backup storage medium including incremental backup data for the at least one work item at a second point in time, and wherein the step (A) comprises a step of copying the first incremental backup data and the second incremental backup data onto a single duplicate backup storage medium.

2. The method of claim 1, wherein the backup data comprises a plurality of work items, and wherein the step (A) comprises a step of:
copying a subset of the plurality of work items onto the at least one duplicate backup storage medium.

3. The method of claim 1, wherein the step (A) includes a step of:
(A)(1) copying the subset of the backup data onto at least one duplicate backup storage medium having different properties than the at least one backup storage medium.

4. The method of claim 3, wherein the step (A)(1) comprises a step of copying the subset of the backup data onto at least one duplicate backup storage medium of a different type than the at least one backup storage medium.

5. The method of claim 1 further comprising a step of:
(B) storing, in a logical duplication database, a record indicating that the subset of the backup data copied in the step (A) has been copied to the at least one duplicate backup storage medium.

6. A computer-readable medium encoded with a program for execution on a computer system including a host computer, a storage device storing data for the host computer, and at least one computer-readable backup storage medium storing backup data copied from the storage device, the program, when executed on the computer system, performs a method of duplicating at least some of the backup data stored on the backup storage medium, the method comprising a step of:
(A) copying only a subset of the backup data from the at least one backup storage medium onto at least one computer-readable duplicate backup storage medium as duplicate backup data so that the duplicate backup storage medium is not an exact duplicate of the at least one backup storage medium:
wherein the at least one backup storage medium comprises a first backup storage medium including incremental backup data for at least one work item at a first point in time and a second backup storage medium including incremental backup data for the at least one work item at a second point in time, and wherein the step (A) comprises a step of copying the first incremental backup data and the second incremental backup data onto a single duplicate backup storage medium.

7. The computer-readable medium of claim 6, wherein the backup data comprises a plurality of work items, and wherein the step (A) comprises a step of copying a subset of the plurality of work items onto the at least one duplicate backup storage medium.

8. The computer-readable medium of claim 6, wherein the step (A) includes a step of:
(A)(1) copying the subset of the backup data onto at least one duplicate backup storage medium having different properties than the at least one backup storage medium.

9. The computer-readable medium of claim 8, wherein the step (A)(1) comprises a step of copying the subset of the backup data onto at least one duplicate backup storage medium of a different type than the at least one backup storage medium.

10. The computer-readable medium of claim 6, wherein the method further comprises a step of:
(B) storing, in a logical duplication database, a record indicating that the subset of the backup data copied in the step (A) has been copied to the at least one duplicate backup storage medium.

11. A backup server for use in a computer system including a host computer, a storage device storing data for the host computer, and at least one computer-readable backup storage medium storing backup data copied from the storage device, the backup server comprising:
a controller to control duplication of the backup data, the controller being adapted to copy only a subset of the backup data from the at least one backup storage medium onto at least one computer-readable duplicate backup storage medium as duplicate backup data, so that the duplicate backup storage medium is not an exact duplicate of the at least one backup storage medium;
wherein the at least one backup storage medium comprises a first backup storage medium including incremental backup data for at least one work item at a first point in time and a second backup storage medium including incremental backup data for the at least one work item at a second point in time, and wherein the controller is adapted to copy the first incremental backup data and the second incremental backup data onto a single duplicate backup storage medium.

12. The backup server of claim 11, wherein the controller comprises:
means for copying only a subset of the backup data onto at least one computer-readable duplicate backup storage medium as duplicate backup data, so that the duplicate backup storage medium is not an exact duplicate of the at least one backup storage medium.

13. The backup server of claim 11, wherein the backup data comprise a plurality of work items, and wherein the controller is adapted to copy a subset of the work items onto the at least one duplicate backup storage medium.

14. The backup server of claim 11, wherein the controller is adapted to copy the subset of the backup data onto at least one duplicate backup storage medium having different properties than the at least one backup storage medium.

15. The backup server of claim 14, wherein the controller is adapted to copy the subset of the backup data onto at least one duplicate backup storage medium of a different type than the at least one backup storage medium.

16. The backup server of claim 11, wherein the controller is adapted to store, in a logical duplication database, a record indicating that the subset of the backup data copied by the controller has been copied to the at least one duplicate backup storage medium.

17. In a computer system including a host computer, a storage device storing data for the host computer, and at least one computer-readable backup storage medium storing backup data copied from the storage device, the backup data including a first work item, a method for duplicating at least some of the backup data stored on the at least one backup storage medium, the method comprising steps of:
(A) reading the backup data corresponding to the first work item from at least one backup storage medium as a logical data stream; and
(B) writing the backup data read in the step (A) to at least one duplicate backup storage medium as a logical data stream;
wherein the step (B) comprises steps of:
(B)(1) writing the backup data read in the step (A) to at least one first backup storage medium as a first logical data stream;
(B)(2) assigning a first expiration time to the at least one first backup storage medium;

(B)(3) writing the backup data read in the step (A) to at least one second backup storage medium as a second logical data stream; and (B)(4) assigning a second expiration time that is different than the first expiration time to the at least one second backup storage medium.

18. The method of claim 17, wherein the first work item is stored on a single backup storage medium, wherein the backup data further includes a second work item stored in the single backup storage medium, and wherein the method includes a step of not duplicating the second work item onto the duplicate backup medium.

19. The method of claim 17, wherein the step (B) includes writing the backup data to at least one duplicate backup storage medium having different properties than the at least one backup storage medium read in the step (A).

20. The method of claim 17, further comprising a step of:
(C) storing, in a logical duplication database, a record indicating that the first work item has been copied to the at least one duplicate backup storage medium.

21. A computer-readable medium encoded with a program for execution on a computer system including a host computer, a storage device storing data for the host computer, and at least one computer-readable backup storage medium storing backup data copied from the storage device, the backup data including a first work item, the program, when executed on the computer system, performs a method for duplicating at least some of the backup data stored on the backup storage medium, the method comprising steps of:
(A) reading the backup data corresponding to the first work item from at least one backup storage medium as a logical data stream; and
(B) writing the backup data read in the step (A) to at least one duplicate backup storage medium as a logical data stream;
wherein the step (B) comprises steps of:
(B)(1) writing the backup data read in the step (A) to at least one first backup storage medium as a first logical data stream;
(B)(2) assigning a first expiration time to the at least one first backup storage medium;
(B)(3) writing the backup data read in the step (A) to at least one second backup storage medium as a second logical data stream; and
(B)(4) assigning a second expiration time that is different than the first expiration time to the at least one second backup storage medium.

22. The computer-readable medium of claim 21, wherein the first work item is stored on a single backup storage medium, wherein the backup data further includes a second work item stored on the single backup storage medium, and wherein the method includes a step of not duplicating the second work item onto the duplicate backup medium.

23. The computer-readable medium of claim 21, wherein the step (B) includes writing the backup data to at least one duplicate backup storage medium having different properties than the at least one backup storage medium read in the step (A).

24. The computer-readable medium of claim 21, wherein the method further comprises a step of:
(B) storing, in a logical duplication database, a record indicating that the first work item has been copied to the at least one duplicate backup storage medium.

25. A backup server for use in a computer system including a host computer, a storage device storing data for the host computer, and at least one computer-readable backup storage medium storing backup data copied from the storage device, the backup data including a first work item, the backup server comprising:
a controller to control duplication of the backup data, the controller being adapted to read the backup data corresponding to the first work item from at least one backup storage medium as a logical data stream, and to write the backup data read by the controller to at least one duplicate backup storage medium as a logical data stream;
wherein the controller is adapted to write the backup data read from the at least one backup storage medium to at least one first backup storage medium as a first logical data stream, assign a first expiration time to the at least one first backup storage medium, write the backup data read from the at least one backup storage medium to at least one second backup storage medium as a second logical data stream, and assign a second expiration time that is different than the first expiration time to the at least one second backup storage medium.

26. The backup server of claim 25, wherein the controller comprises:
means for reading the backup data corresponding to the first work item from at least one backup storage medium as a logical data stream; and
means for writing the backup data read by the controller to at least one duplicate backup storage medium as a logical data stream.

27. The backup server of claim 25, wherein the first work item is stored on a single backup storage medium, wherein the backup data further includes a second work item stored on the single backup storage medium, and wherein the controller is adapted to not duplicate the second work item onto the duplicate backup medium.

28. The backup server of claim 25, wherein the controller is adapted to write the backup data to at least one duplicate backup storage medium having different properties than the at least one backup storage medium read by the controller.

29. The backup server of claim 25, wherein the controller is adapted to store, in a logical duplication database, a record indicating that the first work item has been copied to the at least one duplicate backup storage medium.

* * * * *